United States Patent [19]

Deike

[11] Patent Number: 4,553,358
[45] Date of Patent: Nov. 19, 1985

[54] POST ANCHOR

[75] Inventor: Robert F. Deike, Cheyenne, Wyo.

[73] Assignee: Construction Robotics, Inc., Chicago, Ill.

[21] Appl. No.: 648,039

[22] Filed: Sep. 6, 1984

[51] Int. Cl.[4] .............................................. E02D 5/74
[52] U.S. Cl. ........................................ 52/98; 52/153;
52/165; 52/298; 404/10; 403/2; 403/361;
403/374; 248/519; 248/523
[58] Field of Search ................... 52/98, 153, 154, 155,
52/156, 165, 296, 298; 40/607; 404/10; 403/2,
361, 368, 374; 248/316.2, 412, 156, 530, 523,
519, 511

[56] References Cited

U.S. PATENT DOCUMENTS

| | | | |
|---|---|---|---|
| 962,632 | 6/1910 | Frost | 52/165 X |
| 1,378,948 | 5/1921 | Hage | 52/298 |
| 2,206,625 | 7/1940 | Beach et al. | 52/165 |
| 2,227,553 | 1/1941 | Paque | 52/153 |
| 3,670,468 | 6/1972 | Cordell, Sr. | 52/298 |
| 3,939,563 | 1/1976 | Deike | 30/361 |
| 4,021,977 | 5/1977 | Deike | 52/298 |
| 4,027,856 | 6/1977 | Kingsley | 52/155 X |
| 4,320,608 | 3/1982 | Deike | 52/165 |

Primary Examiner—John M. Jillions
Attorney, Agent, or Firm—Hill, Van Santen, Steadman & Simpson

[57] ABSTRACT

A ground anchor for channel posts has an angle iron leg driven into the ground with a creased upright fin shroud strip or strap embracing the apex or corner of the angle iron at the trailing end of the leg and secured to the ends of the sides of the angle iron providing a V-shaped socket or barrel. The channel post straddles the angle iron with its side legs bottomed on the sides of the angle iron and a compression member bottomed on the strip forces the channel post against the angle iron to spread the legs of the post into tight gripping relation with the angle iron locking the post in the socket. The socket is open-ended and the post can slide over the angle iron leg to any desired depth so that a sign mounted on top of the post can be positioned at a selected height above the ground. The angle iron is driven into the ground to a depth sufficient to bury the shroud strip so that the post is the only portion of the assembly projecting above the ground. The spreading of the legs of the post places them under tension so that when the post is struck by a vehicle it will only bend at the impact zone, but will shear at the tensioned zone so that no metal will project above ground.

14 Claims, 7 Drawing Figures

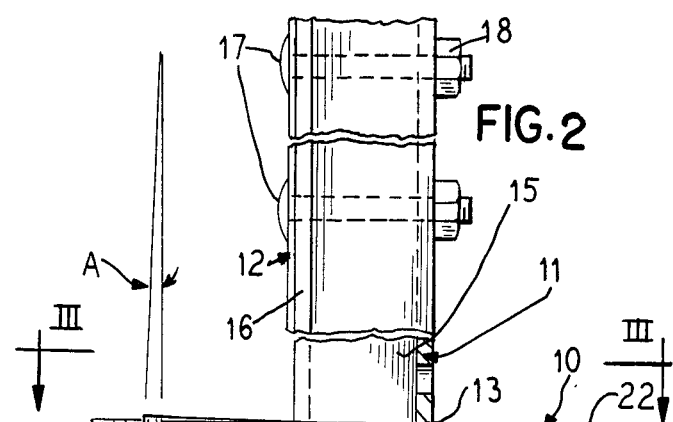
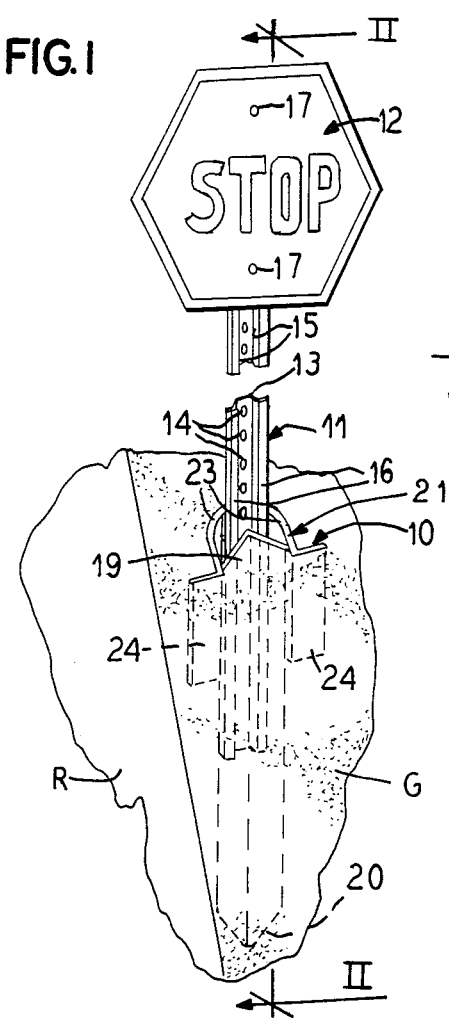
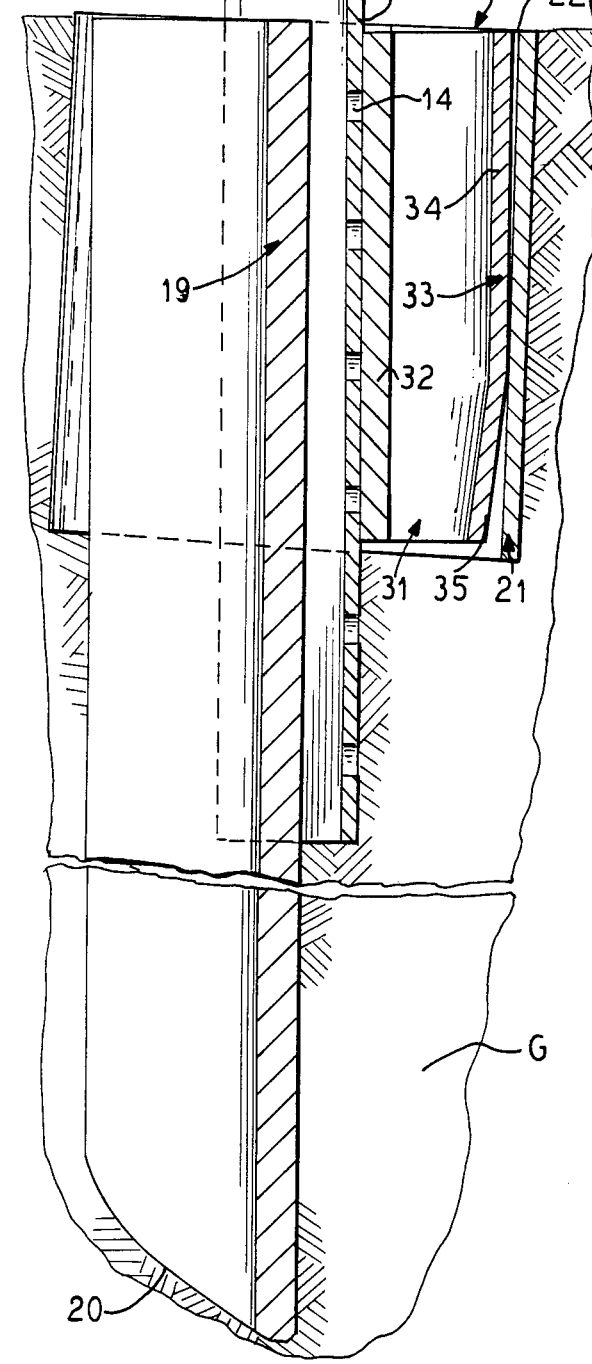
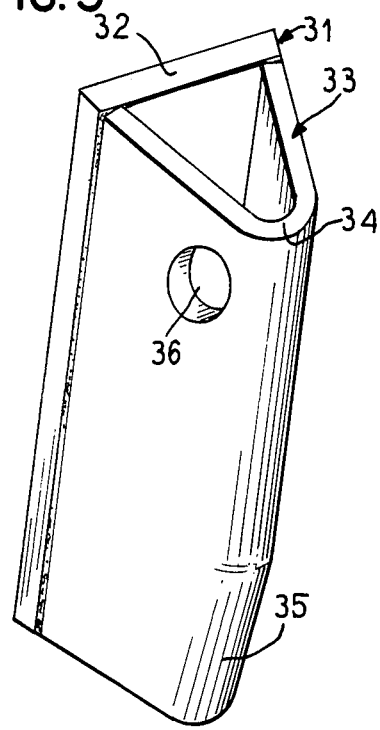

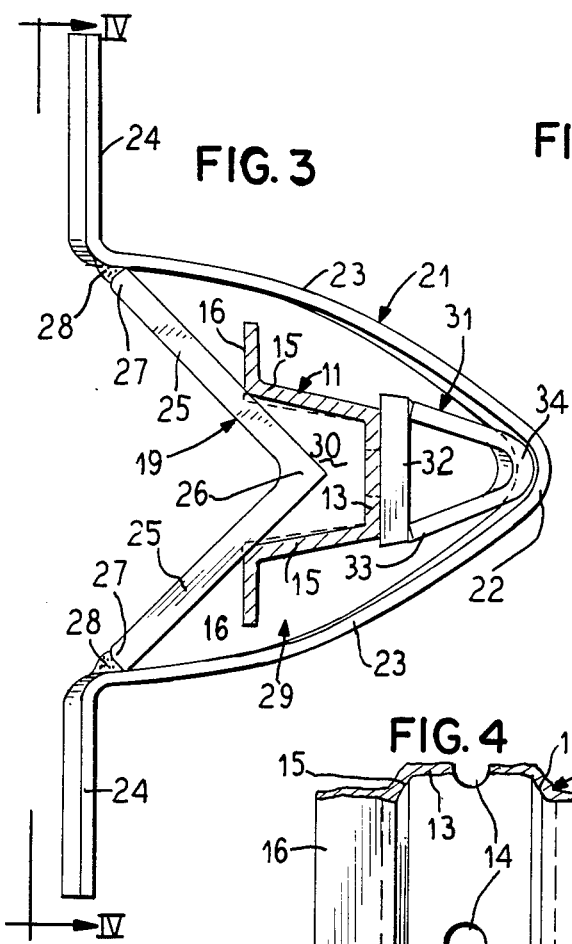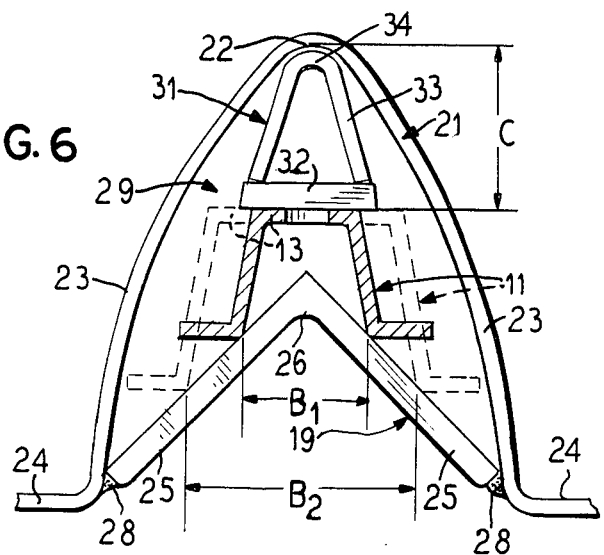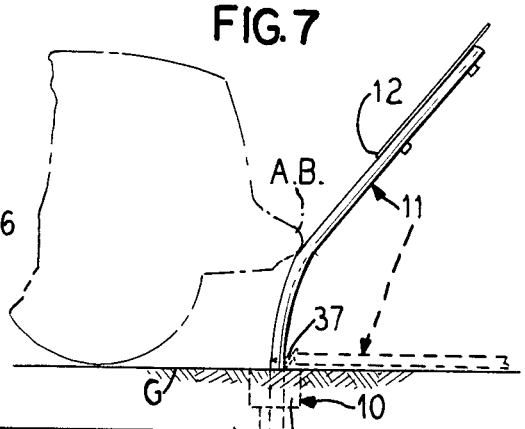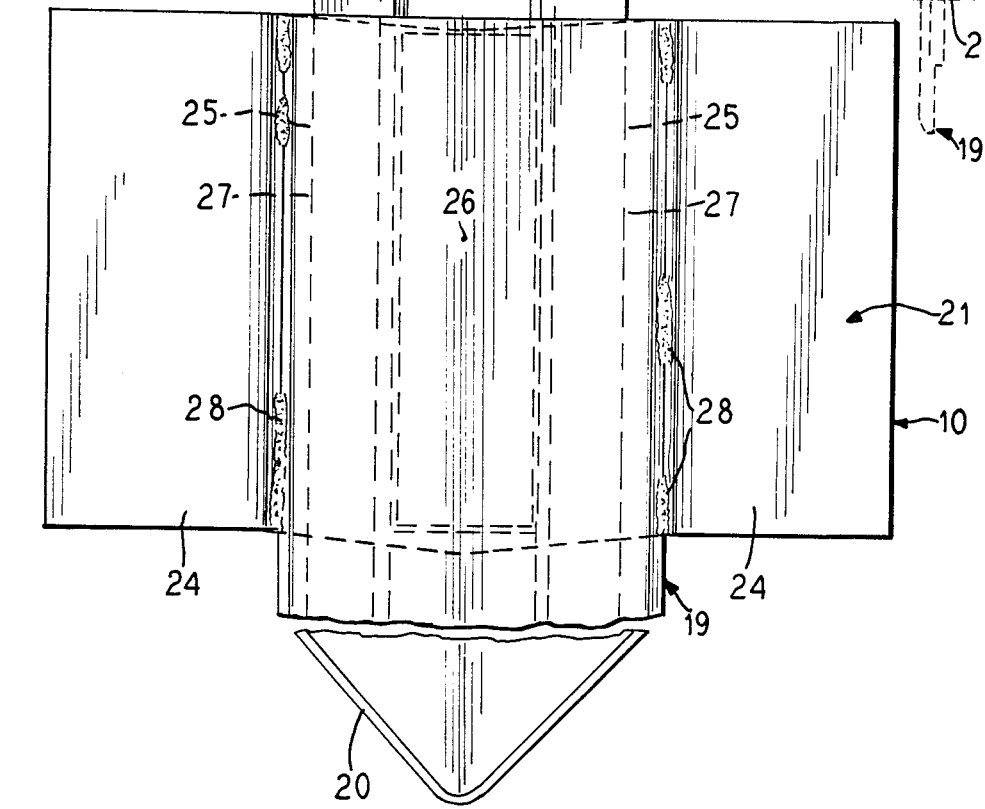

POST ANCHOR

BACKGROUND OF THE INVENTION

1. Field of the Invention

This invention relates to anchors especially adapted for conventional channel sign posts and particularly deals with a post socket assembly with an angle iron leg driven in the ground and having a shroud strip on the trailing end thereof defining a socket receiving a conventional hat section channel post and a compression leg or lock strip driven into the socket to spread the legs of the post over the sides of the angle iron placing them under tension so that the post will shear at ground level upon impact.

2. Description of the Prior Art

My prior U.S. Pat. Nos. 4,021,977, granted May 10, 1977 and 4,320,608, granted Mar. 23, 1982 disclose post anchors for cylindrical type posts where the member driven in the ground embraces the post. In my U.S. Pat. No. 4,021,977, this leg member is a tube providing a barrel receiving the tubular post. The barrel is slotted to receive a wedge driven into a fin or fluke forming member secured to the trailing end of the tubular leg. The wedge deforms the post in the tubular leg. In my U.S. Pat. No. 4,320,608, the tubular leg is replaced with an angle iron receiving the post on the inside of its legs and having a deformable wedge bottomed in the fin forming metal member on the trailing end of the angle iron forcing the cylindrical post against the angle iron legs. In both of these patents, the post is compressed in the socket provided by the anchor and is deliberately weakened at the level emerging from the top of the socket to provide a shear zone that will fracture upon impact of the post. Since different types of installations require different post heights, the weakened fracture zone will vary and I have therefore provided a tool disclosed in my U.S. Pat. No. 3,939,563, granted Feb. 24, 1976, to puncture the post at ground level after it is installed.

Hat section channel posts have now become standard for roadway signs. These channel strip posts are easily and cheaply formed from reworked carbon steel of the type used for railroad tracks, and are supplied in conventional sizes and weights varying from about one pound per foot for light duty installations to about four pounds per foot for heavier duty. The posts have webs perforated along their entire length, side legs extending from the web and out-turned flanges on the side legs so that a sign can be bottomed on the flanges and bolted to the post by bolts extending through the holes in the web.

It would therefore be an improvement in this art to provide anchors for the now commonly used hat section channel posts which place the posts under tension creating fracture zones at ground level without requiring any alteration of the post or deformation of wedge members.

SUMMARY OF THE INVENTION

According to this invention, a conventional angle iron leg, preferably with a tapered cut pointed leading end, and a length of about one to three feet, has a metal shroud welded to the trailing end thereof forming radiating flukes or fins and embracing the corner and exterior sides of the angle iron legs to cooperate therewith in forming a V-shaped socket. The legs of the angle iron are preferably about three inches wide and the shroud strip is preferably about two to eight inches wide. A conventional hat section channel sign post straddles the exterior sides of the angle iron along all or only a part of the length of the angle iron and, in some instances, may even extend beyond the pointed leading end of the angle iron. The side legs of the post are bottomed on the angle iron and that portion of the post web embraced by the shroud in the V-shaped socket provided by the angle iron and surrounding shroud is engaged by a compression leg in the socket which is bottomed against the shroud to force the post against the angle iron thereby spreading the legs over the sides of the angle iron and placing the post under tension load in the socket. The shroud strip is creased to provide an apex for the socket and the compression leg is shaped to fit this apex. The free ends of the shroud strip are bent outwardly, preferably at right angles to cooperate with the creased portion of the strip in forming three fins radiating from the angle iron leg.

The socket provided between the angle iron and the shroud strip is wide enough and deep enough to receive all standard sizes of channel sign posts. The legs of these posts may rest at different levels on the angle iron but the web portions of all of the posts will be spaced the same distance from the crease of the shroud so that a standard sized compression leg will fit all installations. This is accomplished by the fact that the heavier and wider channel posts have longer side legs than the lighter narrower posts and the gap between the post bottomed on the angle iron and the apex or crease of the shroud strip will be substantially constant.

The compression leg is preferably of triangular shape with a base leg spanning the web of the post and with side legs converging to a rounded apex fitting the crease of the shroud strip. Since the gap between this crease and the web of the post is constant, a single size compression leg will fit all installations.

To firmly tighten or lock the compression strip against the post and cause it to spread the legs of the post, the shroud strip may be inclined or canted about two to four degrees relative to the angle iron leg. In addition, the compression leg may have a tapered leading end to facilitate insertion in the socket.

The compression leg in exerting a compression force against the web of the post, at the same time places a tension load on the legs of the post as they are spread apart over the angle iron. This combined compression and tension zone of the post at the socket area creates a shear fraction zone at the top of the socket so that when the post is impacted, it will fracture at ground level where it emerges from the socket.

The anchor system is installed by driving the angle iron leg into the ground to a depth sufficient to submerge the shroud or place its top edge at ground level. The post is then bottomed against the angle iron and driven to slide through the socket and along the sides of the angle iron to a desired depth so that a selected length portion thereof will extend to a desired height above the ground. The compression leg is then driven into the socket to spread the legs of the post against the angle iron creating the compression and tension zone and at the same time firmly locking the post in the socket.

Alternatively, the post may be anchored to the angle iron leg before the leg is driven into the ground by driving the compression leg into the socket against the post at the desired level of the post and then driving the assembly into the ground to bury the shroud.

The radiating portions of the shroud form flukes or fins stabilizing the angle iron leg against tilting and providing additional ground engaging faces to anchor the leg upright in the ground.

Preferred angle iron for the leg has a right angle corner, legs about three to four inches wide, and a thickness about a quarter inch. Angle iron sizes may vary to suit conditions. The shroud strip for such an angle iron will have a creased portion with an apex about 2 to 2½ inches from the corner of the angle iron and side legs diverging from the apex about 4½ inches long with out-turned fins about 2 to 2½ inches wide. The side legs are preferably bowed outwardly to provide more space for receiving the out-turned legs of the channel strip post. The gap between the web of the post and the apex or crease of the shroud is about 1½ to 2 inches, with the compression leg being sized to tightly fit this gap and spread the legs of the post over the legs of the angle iron.

It is then an object of this invention to provide post anchors creating fracture zones at ground level which do not require any alterations of the post.

Another object of this invention is to provide post anchors or socket systems for standard channel strip sign posts which create compression and tension zones causing the post to fracture at ground level upon impact.

Another object of this invention is to provide improved angle iron anchors for channel strip posts.

A further object of this invention is to provide ground sockets for highway sign posts which accept variable lengths of posts to establish a desired post height and which creates a ground level fracture zone without altering the post.

Another object of this invention is to provide post anchor sockets on which channel strip posts are straddled, and using compression legs to stress and anchor the post in the socket without deforming the compression leg.

Another object of this invention is to provide a post anchor socket accepting an elongated compression leg having extensive engagement with the post without being deformed in use.

Other and further objects of this invention will become apparent to those skilled in this art from the following detailed description of the annexed sheets of drawings which show a best mode embodiment of the invention.

ON THE DRAWINGS

FIG. 1 is a broken perspective view of a channel strip sign post anchored in the ground along a roadway by a post anchor or socket of this invention;

FIG. 2 is an enlarged fragmentary longitudinal sectional view along the line II—II of FIG. 1;

FIG. 3 is a horizontal sectional view along the line III—III of FIG. 2;

FIG. 4 is a fragmentary and broken elevational view along the line IV—IV of FIG. 3;

FIG. 5 is a perspective view of a compression leg for the socket of FIGS. 1–4;

FIG. 6 is a diagrammatic plan view illustrating the manner in which channel posts of different sizes rest at different levels on the angle iron leg of the socket to provide a constant gap between the apex of the shroud strip and the webs of the posts; and FIG. 7 is a diagrammatic side elevational view illustrating the manner in which the channel post is fractured at ground level upon impact by an automobile bumper above ground level.

DETAILED DESCRIPTION OF THE DRAWINGS

As shown in FIG. 1, the ground anchor or post socket 10 of this invention is driven in the ground G alongside a road R carrying a channel post 11 for a stop sign 12. The post 11 is a standard highway channel strip post having a so-called "hat" cross section, including a web or crown 13 with perforations 14 spaced at intervals of about one inch or so and having side legs 15 extending at right angles from the web to out-turned flanges or fins 16. The sign 12 is bottomed on these flanges 16 and bolts 17 with heads bottomed on the sign extending through the sign and through aligned perforations 14 to receive nuts 18, as better shown in FIG. 2. It will be understood, of course, that the bolts can be replaced with rivets or any other fasteners locking the sign 12 against the flanges or fins 16 of the post 11.

The anchor 10 is composed of a standard right angle iron leg 19 with a pointed leading end 20 and a metal shroud strip or ribbon 21 welded to the trailing end thereof. The strip 21 is creased or bent at the mid-section thereof to form an apex 22 as better shown in FIG. 3, and has outwardly bowed side legs 23 diverging from this apex 22 to out-turned flanges or fins 24. The angle iron leg 19 has the right angle sides 25 thereof extending from its apex corner 26 to ends 27 which are welded at 28 to the inside face of the shroud legs 23 adjacent their junctions with the out-turned flanges 24.

Thus, the shroud 21 embraces and receives the outer sides of the angle iron legs 25 with the apex or corner 26 of the angle iron projecting toward the crease or apex 22. A V-shaped socket 29 is thereby provided receiving the post 11 therethrough. The side legs 15 of the post are bottomed on the sides 25 of the angle iron with the web 13 of the post spaced from the corner 26 of the angle iron. The post 19 thus straddles the angle iron. The corner 26 of the angle iron projects into the channel 30 of the post and the sides of the angle iron form a wedge effective to spread the legs 15 of the post.

As illustrated in FIG. 2, the shroud strip 21 is canted or tilted relative to the angle iron leg 19 at an angle A. This angle need only be about 2 to 4 degrees to taper the apex 22 toward the corner 26 of the post as the shroud extends from the top of the leg.

A compression strip 31 as shown in perspective in FIG. 5 has a length substantially coextensive with the depth of the socket 29 or even longer than this depth to be positioned in the socket between the web 13 of the post 19 and the crease apex 22 of the shroud strip 21. The compression leg has a flat rigid base 32 substantially coextensive with the width 13 of the channel strip web to provide extended area contact with this web. The base 32 is integral with or secured to a V-shaped member 33 with a rounded apex 34 fitting the crease apex 22 of the shroud and with divergent sides extending to and secured to the base 32. The leading end of the apex 34 is preferably tapered at 35 toward the base 32 for ease in inserting the leg into the socket 29.

A pry hole 36 is provided in the member 33 to receive a tool lifting the compression leg out of the socket when it is desired to disassemble the post from the socket.

The compression leg 31 is forced into the socket between the apex crease 22 and the web 13 of the post to force the post toward the angle iron causing the legs 25 of the angle iron to spread apart the legs 15 of the post creating a tension load on these legs. At the same time, the base 32 of the compression leg exerts a compression load on the web 13. As a result, that portion of the post 11 in the socket 29 is placed under a combination of compression and tension loads creating a shear stress where the post emerges from the socket.

As illustrated in FIG. 6, posts 11 of different sizes fit freely in the socket 29 but rest at different levels on angle iron 19. As shown, the smaller post 11 illustrated in solid line contacts the angle iron 19 as illustrated at B-1 while the large post 11 contacts the angle iron at a wider zone B-2. However, the webs 13 of both posts remain at the same distance from the apex crease 22 of the shroud strip 21 so that the gap C between the web and the apex remains the same for the different sized posts. This desired condition is created by the standard sizes of the posts. Thus, for example, a standard light duty channel post weighing about two pounds per foot will have a web width of 1-5/16 inches and a leg length of 1¼ inches with a flange width of about ⅜ inches. A heavy duty post weighing four pounds per foot has a web width of 1⅞ inches, a leg length of 1½ inches and about the same flange width of ⅜ inch. Since the increase in web width causes the legs to bottom on the angle iron a greater distance from the corner of the angle iron, the increased length of these legs will keep the webs in the same spacial relationship with the apex of the angle iron and the gap between the webs and the apex crease of the socket remains constant. The compression leg is not deformed as it is forced into the socket.

The standard channel strip sign posts are carbon steel having a carbon content of about 0.09 percent and are generally made from recycled railroad track. When such steels are placed under tension and compression load by the anchor of this invention, they become quite brittle at the zone where they merge into an unloaded condition. As a result, a shear stress is created right at ground level and as illustrated in FIG. 7, when the post 11 is impacted by an automobile bumper A.B. above the level of the ground G, it will fracture at ground level as shown at 37 so that no portion of the post will project above ground.

It will be understood as illustrated in FIGS. 1 and 2 that the anchor 10 of this invention is driven into the ground to bury both the angle iron leg 19 and the shroud 21 with the shroud forming three radiating flukes or fins stabilizing the leg in the ground. The only portion of the assembly projecting above ground is the post which will fracture at ground level as described.

Although the teachings of my invention have herein been discussed with reference to specific theories and embodiments, it is to be understood that these are by way of illustration only and that others may wish to utilize my invention in different designs and applications.

I claim:

1. A ground anchor for channel highway sign posts of the type having a web and side legs which comprises an angle leg having sides and an apex corner with a leading end for driving into the ground and a trailing end, an upright fin forming shroud strip embracing the apex corner and sides at the trailing end of the leg secured to the ends of the sides forming a V-shaped socket for receiving a channel post with the ends of the legs of the channel post bottomed on the sides, and a compression member in the socket bottomed on the strip pressing the legs of the channel post against the sides causing the legs of the post to spread apart and be placed under tension as they are locked in the socket.

2. The ground anchor of claim 1 wherein the angle leg is an angle iron strip with the sides at right angles and the apex providing a 90° angle between the legs.

3. The ground anchor of claim 1 wherein the sign post is adapted to slide freely along the angle leg receiving the apex corner of the leg in the channel thereof and the compression member engages the web along the length thereof in said socket.

4. The ground anchor of claim 1 wherein the compression member is elongated and extends through the socket.

5. The ground anchor of claim 1 wherein the shroud strip is canted relative to the angle leg providing a socket converging from top to bottom toward the leg.

6. The ground anchor of claim 1 wherein the shroud strip is creased providing a V-shaped apex opposite the apex corner of the leg and the compression member fits in said apex.

7. A ground anchor for sign posts and the like which comprises an elongated angle iron member having sides and an apex corner with a leading end for driving into the ground and a trailing end terminating at ground level, a wide metal ribbon creased to form an apex, diverging legs, and out-turned end flanges welded to the ends of the sides of the angle iron at the ends of the legs thereof at the trailing end of the angle iron to form fins radiating from the angle iron and an open-ended V-shaped socket with the corner of the angle iron spaced from the apex of the ribbon, said socket adapted to freely receive the sign post therethrough bottomed on the angle iron, and a compression strip in said socket pressing the post against the angle iron to lock the post to the leg.

8. The ground anchor of claim 7 wherein the angle iron member is a conventional sized angle iron strip and the socket has a depth substantially less than the length of the angle iron member.

9. The ground anchor of claim 7 wherein the compression strip is inserted in the socket to such a depth to create a tension stress in the post which will cause the post to fracture at the socket zone when impacted above the zone.

10. The ground anchor of claim 7 wherein the sign post has a channel with side legs bottomed on the sides of the angle iron which are spread apart by the compression strip.

11. The ground anchor of claim 7 wherein the ribbon is canted toward the leading end of the angle iron member.

12. A ground anchor for hat section highway sign posts of the type having a web perforated along its length at spaced intervals, side legs extending from the web and out-turned flanges on the ends of the legs so that fasteners extending through the apertures of the web will bottom a sign against the flanges which comprises a right angle iron leg having a leading end for driving in the ground and a trailing end adapted to be positioned substantially level with the ground, an upright metal strip embracing the trailing end of the leg around the corner and sides thereof and secured thereto to cooperate therewith forming an open-ended V-shaped socket, said socket adapted to freely receive a hat section highway sign post therethrough with the legs of the post bottomed on the outer faces of the sides of the angle iron and with the web and flanges spaced from the strip, and an elongated member forced in said socket between the web of the post and the strip effective to force the legs of the post over the sides of the angle iron spreading the legs apart and placing them under tension creating a shear stress zone at the trailing end of the leg to cause the post to fracture at ground level when impacted by a vehicle or the like.

13. The ground anchor of claim 12 wherein the elongated member has a flat face engaging the web of the sign post along a substantial area thereof.

14. The ground anchor of claim 12 wherein the metal strip has side legs bowed outwardly to increase the size of the socket.

* * * * *